United States Patent

Omura

[11] Patent Number: 5,943,515
[45] Date of Patent: Aug. 24, 1999

[54] PATTERN PROJECTION DEVICE FOR FOCUS DETECTION

[75] Inventor: Yusuke Omura, Yokohama, Japan

[73] Assignee: Canon Kabushiki Kaisha, Tokyo, Japan

[21] Appl. No.: 08/864,081

[22] Filed: May 28, 1997

[30] Foreign Application Priority Data

May 31, 1996 [JP] Japan .................................. 8-160602

[51] Int. Cl.$^6$ .............................. G03B 13/36; G01C 3/08
[52] U.S. Cl. .......................................................... 396/106
[58] Field of Search ............................. 396/106; 356/3.1, 356/3.11, 3.12, 4.04

[56] References Cited

U.S. PATENT DOCUMENTS 4,943,824  7/1990  Nabeshima et al. .................... 396/106
5,274,429  12/1993  Misawa et al. ......................... 396/106
5,485,235  1/1996  Meyers ................................... 396/106

FOREIGN PATENT DOCUMENTS

8-067062  3/1996  Japan .
9-184965  7/1997  Japan .

*Primary Examiner*—W. B. Perkey
*Attorney, Agent, or Firm*—Fitzpatrick, Cella, Harper & Scinto

[57] ABSTRACT

There is disclosed a pattern projection device for a camera having a plurality of right, left, upper, and lower focus detection regions in the view field region, which device has an optical unit for splitting a pattern having a predetermined shape into a plurality of patterns in each of the vertical and horizontal directions so as to project the pattern onto the plurality of focus detection regions.

4 Claims, 9 Drawing Sheets

PATTERN PROJECTION DEVICE FOR FOCUS DETECTION

BACKGROUND OF THE INVENTION

1. Field of the Invention

The present invention relates to a projection system for automatic focus detection and, more particularly, to a projection system for automatic focus detection, which broadens the illumination range and improves focus detection precision in passive and active focus detection schemes suitably used in focus detection executed by a photographing system by projecting a projection pattern from a projection system toward the object side and receiving the projection pattern image reflected by the object side, and is used together with an automatic focus detection device of, e.g., a TTL (Through the Lens) type camera.

2. Related Background Art

Conventionally, upon execution of focus detection by focus detection devices in TTL type cameras such as still cameras, movie cameras, video cameras, and the like, for example, when an object has a low luminance or low contrast, the object is illuminated with light emitted by an illumination device (projection system) built in a camera main body or a flash device, or a projection lens and a predetermined projection pattern are assembled in the illumination device, and the projection pattern is projected onto the object to give contrast to it.

Figure 10:
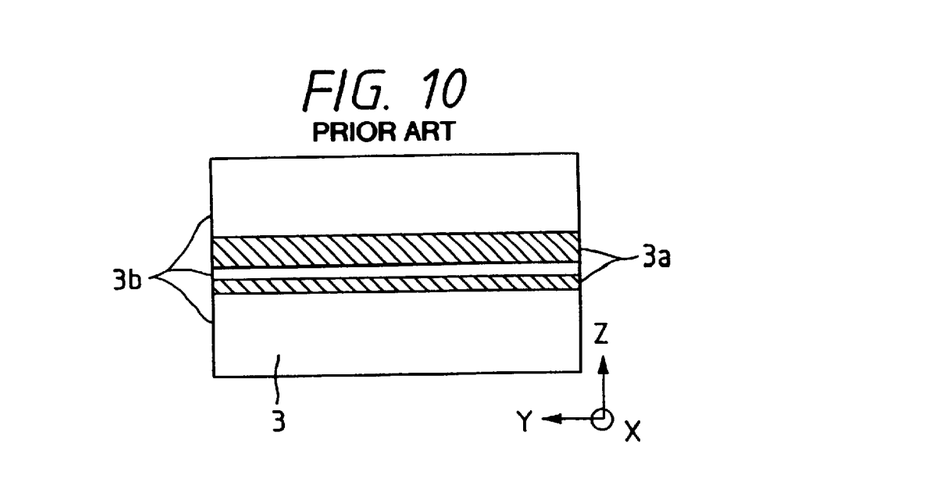
FIG. 10 is a schematic view showing an example of a conventional projection pattern.
Figure 11:
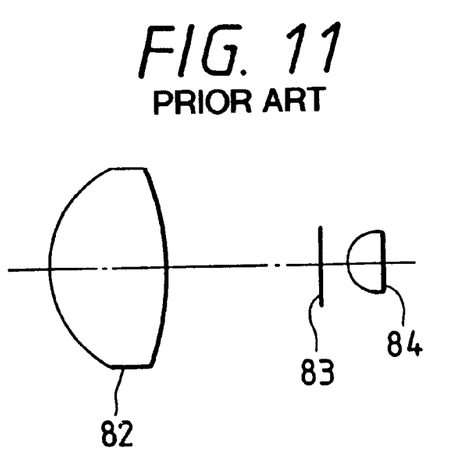
FIG. 11 is a schematic view showing the principal part of a conventional projection system for automatic focus detection.

FIG. 11 is a schematic view showing the principal part of a conventional projection system for automatic focus detection. Referring to FIG. 11, a light source 84 comprises, e.g., an LED. A projection pattern 83 has a plurality of light-shielding portions 3a as linear bands and a plurality of light-transmitting portions 3b, as shown in, e.g., FIG. 10. A projection lens 82 is arranged in front of the pattern 83.

In FIG. 11, the projection pattern 83 illuminated by the light source 84 is projected toward the object side via the projection lens 82, and a projection pattern image reflected by the object side is detected by a detection system (not shown), thus attaining focus detection of the photographing system.

Figure 12:
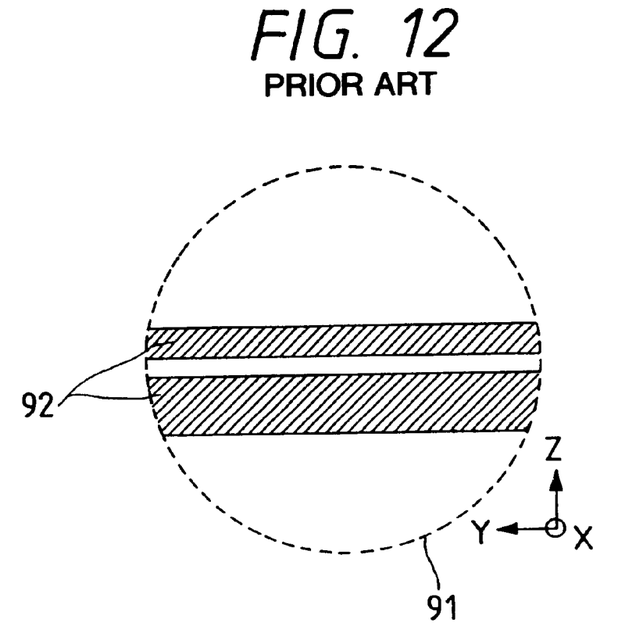
FIG. 12 is a view showing the irradiation range in the conventional projection system.

FIG. 12 is an explanatory view showing the projection irradiation (illumination) range and the projection pattern image when the projection pattern 83 is projected toward the object side.

In FIG. 12, the interior of a dotted circle 91 corresponds to the illumination range, and the ranges indicated by hatched portions 92 correspond to the projection pattern image on the object obtained by projecting the projection pattern 83 by the projection lens 82.

In most focus detection devices using such automatic focus detection projection system, the focus detection range is located at the center of the photographing field angle (at the center of the optical axis of the photographing lens), and auxiliary light illuminates only the center of the object side except for correction of parallax or the like.

However, in a photographing apparatus having a focus detection region at a point other than the center of the optical axis of the photographing lens, the focus detection region on the object side differs depending on the focal length of the photographing lens. For example, in a lens with a relatively large focal length, the focus detection region at a point other than the center of the optical axis of the photographing lens is close to the center of the photographing range on the object side. However, as the focal length of the photographing lens becomes smaller, the focus detection region at a point other than the center of the optical axis of the photographing lens separates farther outwardly from the photographing range on the object side. That is, the focus detection region is present at a position in a direction separating from the center of the optical axis.

Accordingly, in a camera that can use exchangeable photographing lenses or in a camera which mounts a lens having a variable focal length, the automatic focus detection projection system must illuminate a broader range. For this reason, a conventional projection system uses a plurality of illumination devices, a plurality of light sources, or the like to broaden the illumination range.

However, using a plurality of illumination devices, a plurality of light sources, or the like results in a large illumination device as a whole and high cost.

In recent automatic focus detection devices, it is strongly demanded to attain focus detection at points other than the center of the field angle, and the focus detection range of a camera tends to cover multiple points and a broader range.

Figure 13:
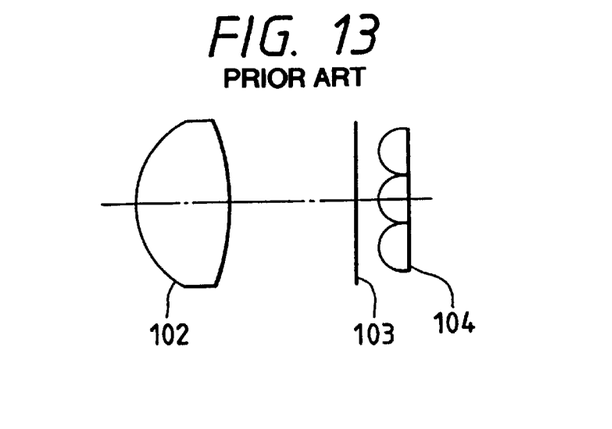
FIG. 13 is a schematic view showing the principal part of a conventional projection system for automatic focus detection.

FIG. 13 is a schematic view showing the principal part of a projection system for automatic focus detection used together with such automatic focus detection device.

Referring to FIG. 13, a light source unit 104 has a plurality of light-emitting portions (light sources). A projection pattern 103 has an elongated shape in the widthwise direction of the light source unit 104. A projection lens 102 has wide field angle performance.

When a broad projection range (illumination range) is obtained by arranging the plurality of light-emitting portions and illuminating the broad projection pattern 103, an increase in the number of light sources leads to a large device as a whole and high cost, and it is difficult to attain a wide field angle of the projection lens. For this reason, such system can hardly be put into practical applications.

Figure 14:
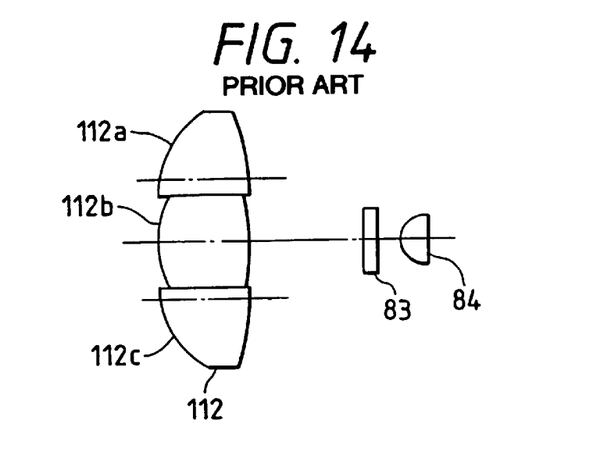
FIG. 14 is a schematic view showing the principal part of a conventional projection system for automatic focus detection.

FIG. 14 is a schematic view similarly showing the principal part of a projection system for automatic focus detection used together with such automatic focus detection device. The same reference numerals in FIG. 14 denote the same parts as in FIG. 11.

Referring to FIG. 14, a projection lens 112 is divided into three regions (lens portions) 112a, 112b, and 112c, which have different optical axes. In FIG. 14, by providing a plurality of optical axes to the projection lens 112, projection ranges, the number of which is equal to that of optical axes, are obtained.

However, since a projection system (projection device) that illuminates the pattern 83 with the light source 84 forms the image of the projection pattern 83 on the object, the illumination range corresponds to a blurred image of the light source 84. Accordingly, when the plurality of optical axes are provided like the projection lens 112 shown in FIG. 14, and the lens is divided to attain a size reduction of the overall device, the illumination range as the blurred image of the light source 84 is also divided, resulting in narrow illumination ranges.

To avoid such problem, the projection lens may be made up by coupling a plurality of lenses without dividing a single lens. However, such arrangement results in a huge device.

Figure 15:
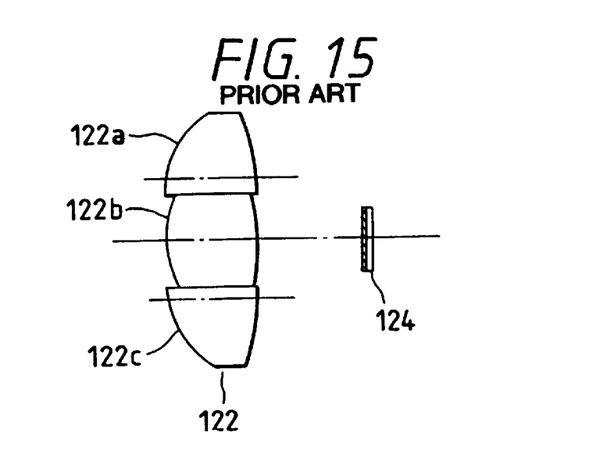
FIG. 15 is a schematic view showing the principal part of a conventional projection system for automatic focus detection.

In order to solve the above-mentioned problems, a projection system for automatic focus detection shown in FIG. 15 has been proposed conventionally. FIG. 15 is a schematic view showing the principal part of a conventional projection system for automatic focus detection.

Referring to FIG. 15, a light source unit 124 itself, which integrates a light source and a projection pattern is imaged and projected onto an object by a projection lens 122. With this arrangement, the illumination range is not divided by the divided lens portions unlike in the projection system shown in FIG. 14.

However, in the projection system shown in FIG. 15, since off-axis projection lenses 122a and 122c are considerably decentered from the optical axis to broaden the projection range, the projection lens becomes bulky, and it is very difficult to maintain high projection/imaging performance of the lens up to the edge portions of the field angle. Consequently, poor off-axis projection performance adversely affects focus detection precision.

In all the prior arts described above, when the pattern is also to be divisionally projected in a direction perpendicular to the plane of drawing used in their descriptions, the number of light sources and projection lens portions must be increased as in division in the up-and-down direction on the plane of drawing. As a result, the entire device becomes larger in proportion to the illumination range.

SUMMARY OF THE INVENTION

It is the first object of the present invention to provide a pattern projection device for a focus detection device having a plurality of focus detection regions.

It is the second object of the present invention to provide a projection device which can attain uniform light projection over a broad illumination region while maintaining high imaging performance of a projection pattern image.

The present invention comprises a pattern with a predetermined shape, and an optical unit for projecting the pattern onto a plurality of regions above and below a photographing view field.

Also, a projection system for automatic focus detection according to the present invention is characterized in that when focus detection of a photographing system is attained by projecting, as a projection pattern, a light-emitting portion with a predetermined shape, which makes up a light source, toward the object side by a projection lens, and receiving a projection pattern image reflected by the object side by a light-receiving system, an optical panel having a prism member, which has a plurality of prism surfaces making a plurality of normal angles with the optical axis of the projection lens and is arranged on a substrate of the optical panel, is arranged in the vicinity of the projection lens so as to form a plurality of projection pattern images on the object side.

Other features of the present invention will become apparent from the following description of the specification taken in conjunction with the accompanying drawings.

DETAILED DESCRIPTION OF THE PREFERRED EMBODIMENTS

Figure 1:
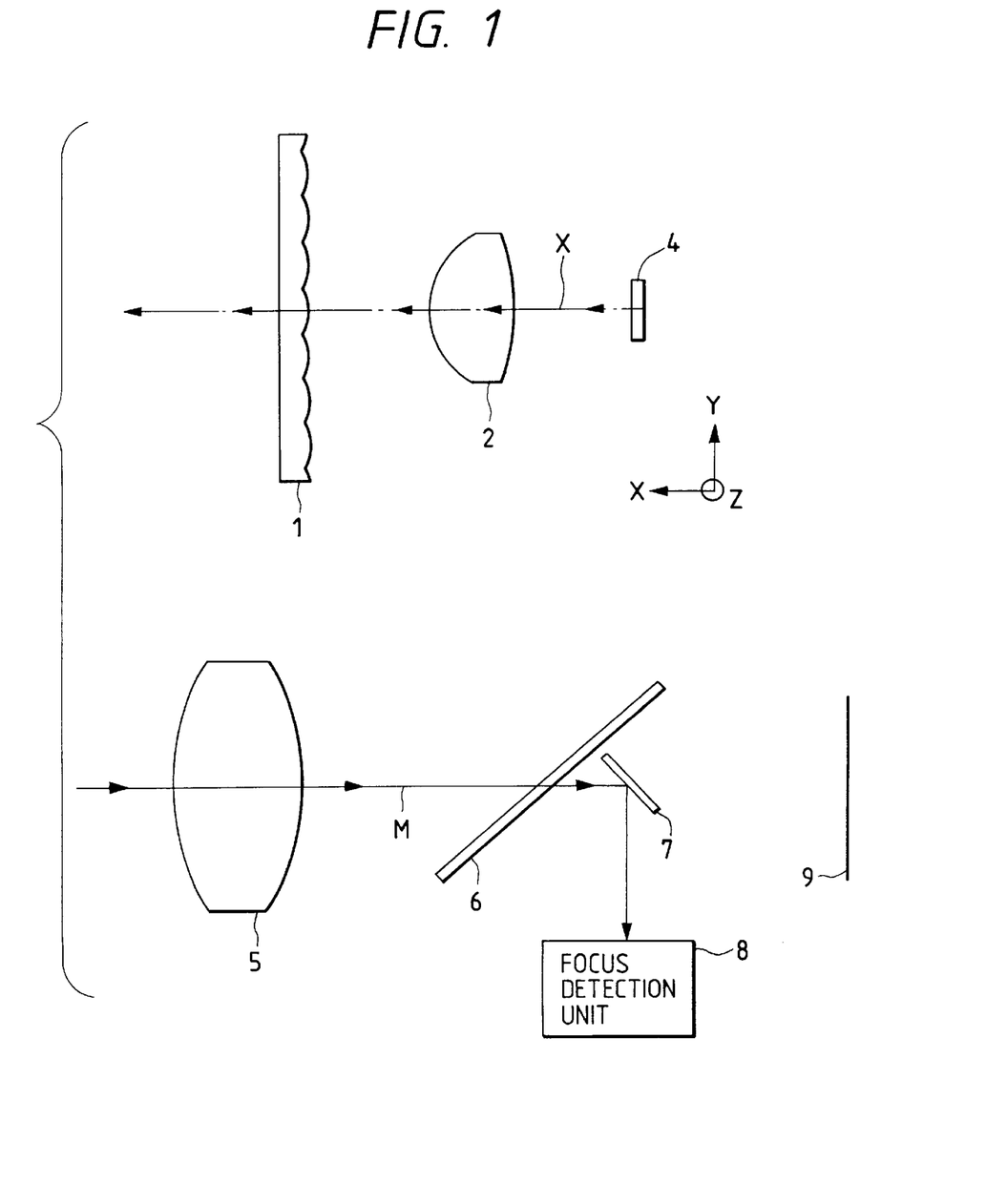
FIG. 1 is a schematic view showing the principal part of the first embodiment when the present invention is applied to a portion of a photographing system.

FIG. 1 is a schematic view showing the principal part of a projection system for automatic focus detection according to the first embodiment when the present invention is applied to a portion of a photographing system.

Figure 4:
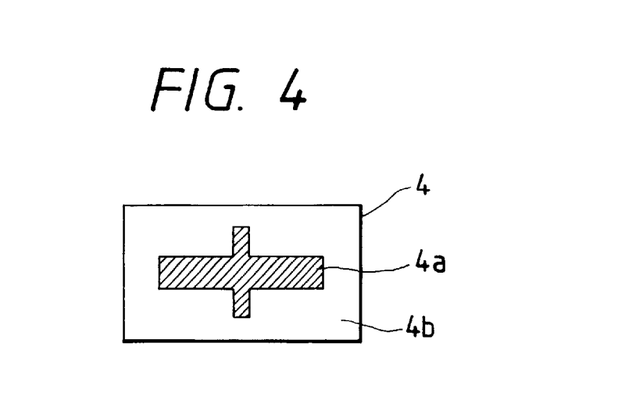
FIG. 4 is an explanatory view showing an example of a projection pattern having a light source according to the present invention.

Referring to FIG. 1, a light-emitting member 4 serves as a light source having a projection pattern, and comprises, e.g., an LED or the like having a light-emitting portion 4a, as shown in FIG. 4.

In FIG. 4, the light source 4 comprises the cross-shaped light-emitting portion 4a and a non-emitting portion 4b.

In this embodiment, the light-emitting portion 4a is projected as a projection pattern toward the object side via an optical panel 1 by a projection lens 2. The projection lens 2 projects the cross-shaped light-emitting portion 4a of the light source 4 as a projection pattern image onto the object via the optical panel 1. The light-emitting portion 4a will also be referred to as a projection pattern hereinafter.

Figure 5:
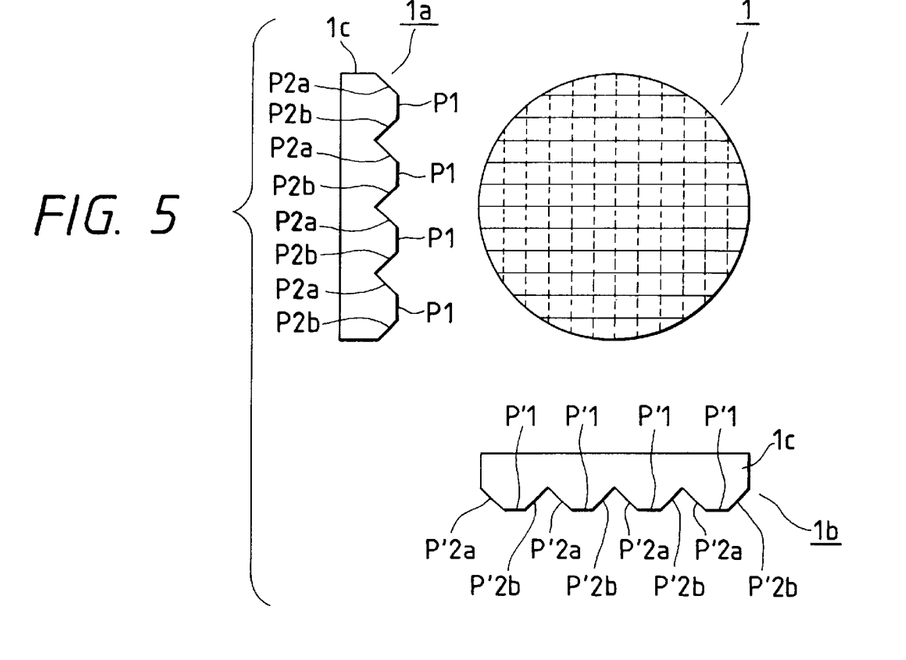
FIG. 5 is an explanatory view of an optical panel according to the present invention.

The optical panel 1 is arranged in front of (on the object side) the projection lens 2, and is constituted, as shown in FIG. 5. That is, prism members 1a and 1b, on one side of each of which a plurality of planar prism surfaces (in FIG. 5, three surfaces defining a trapezoidal section) having a plurality of normal line directions on one side are formed, and arranged on the front and rear surfaces of a substrate 1c, respectively such that the arranging directions of the plurality of prism surfaces, are perpendicular to each other.

In this embodiment, the light source 4, the projection lens 2, and the optical panel 1 constitute an element of a projection system.

A photographing system (photographing lens) 5 forms an object image on an imaging surface 9, and also supplies an object image (in the passive mode) illuminated by natural light such as sunlight and a projection pattern image (in the active mode) projected onto the object by the projection system to a focus detection unit (light-receiving system; to be described later) 8 via a semi-transparent surface of a quick return mirror 6 and a sub mirror 7.

The focus detection unit 8 detects an image signal associated with the object image obtained via the photographing system 5. When the object is dark, the focus detection unit 8 detects the reflected pattern image of the projection pattern 4a projected toward the object side by the projection system, and attains focus detection of the photographing system 5 by a known focus detection method. In FIG. 1, the projection system has an optical axis X, and the photographing system has an optical axis M.

In this embodiment, to attain focus detection of the focus detection unit 8, a light beam based on the object image entering the photographing system 5 is normally supplied to the focus detection unit 8 via the semi-transparent surface of the quick return mirror 6 and the sub mirror 7. However, for example, when the object has a low luminance insufficient for focus detection or when the object has too low contrast to attain focus detection in the passive mode, the light source 4 in the projection system incorporated in a camera main body or an external flash unit is controlled to emit light on the basis of a signal from the focus detection unit 8. Then, the projection pattern based on the light-emitting portion 4a of the light source 4 that emitted light is projected toward the object side via the optical panel 1 by the projection lens 2.

The photographing system 5 supplies the projection pattern image reflected by the object side to the focus detection unit 8 via the semi-transparent surface of the quick return mirror 6 and the sub mirror 7, and the focus detection unit 8 detects the imaging state of the formed projection pattern image, thus attaining focus detection of the photographing system 5.

At this time, in order to detect the imaging state of the projection pattern image and to attain focus detection of the photographing system 5, two secondary object images are formed by a light beam that has passed through the photographing system 5, and the deviation amount between their relative positions is detected.

A device having a two-dimensional (areal) focus detection region will be briefly described below.

Figure 16A:
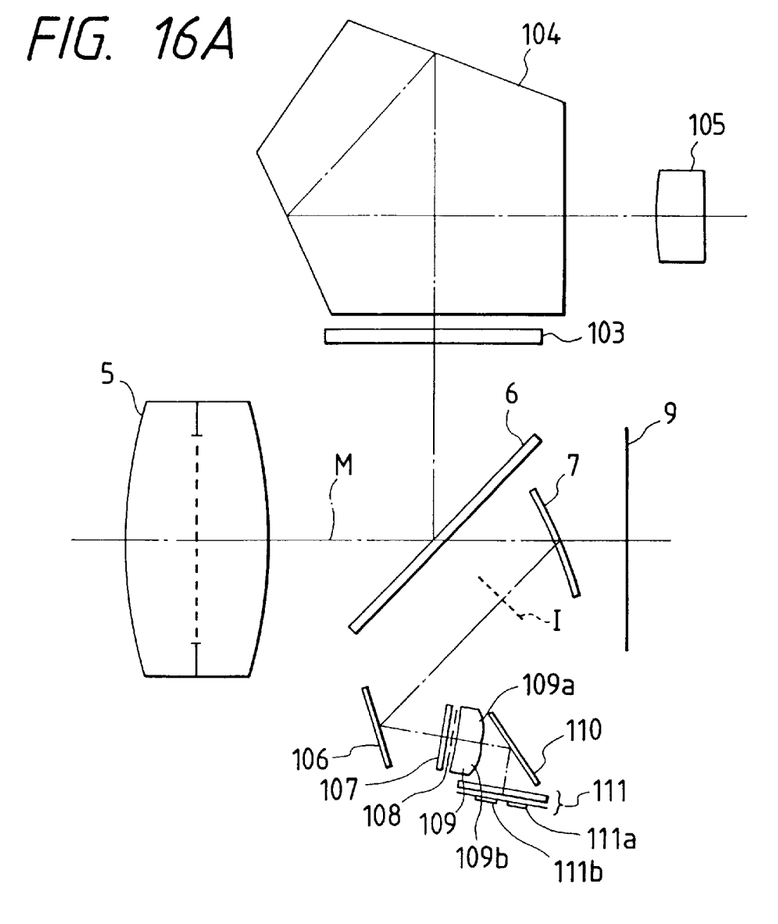
FIGS. 16A and 16B are views showing a focus detection device according to the present invention.
Figure 16B:
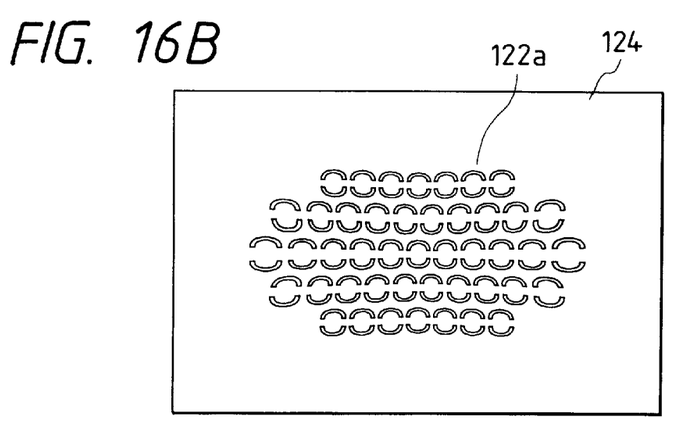

FIGS. 16A and 16B show a focus detection device and a distance measurement region disclosed in, e.g., Japanese Patent Application Ser. Nos. 7-354103 and 8-67062.

In FIG. 16A, a photographing lens 5 forms an image on a film surface (imaging surface) 9. A light beam reflected by a quick return mirror 6 reaches the eye of a photographer via a focusing screen 103, a pentagonal roof prism 104, and an eyepiece 105.

On the other hand, the quick return mirror 6 has a semi-transparent surface, and a light beam that has passed through the quick return mirror is reflected by a sub mirror 7 and a sub mirror 106 to be supplied to a focus detection device shown in a lower portion of FIG. 16A. Note that I represents the conjugate position with the film surface. This focus detection device has a pair of re-imaging lenses 109 (109a and 109b) to split the pupil of the photographing lens, so that light beams in different regions of the photographing lens are imaged on focus detection sensors 111 (111a and 111b). The pair of focus detection sensors comprise area type sensors. Note that an infrared cut filter 107 and a stop 108 having a pair of apertures are arranged in front of the re-imaging lenses 109.

In this arrangement, the light intensity distributions on the pair of sensors change with the object distance. By detecting the relative positions of the light intensity distributions by a focus detection processing circuit (not shown), the focus adjustment state of the photographing lens can be detected.

FIG. 16B shows the focus detection region. In FIG. 16B, a finder view field region 124 includes focus detection regions 122a. In this embodiment, the focus detection device has 45 points of focus detection regions. The above-mentioned focus detection sensors 111 (111a, 111b) detect the focal point states of the photographing lens in these focus detection regions.

As described above, this embodiment has a plurality of focus detection regions above and below the view field region in addition to conventional ones on the right and left sides of the view field region. The pattern projection device of the present invention is effective for a device having a plurality of right, left, upper, and lower focus detection regions.

As described above, this embodiment adopts a so-called active type focus detection system in which auxiliary light is projected when the object has too low luminance or contrast to attain focus detection.

Figure 2A:
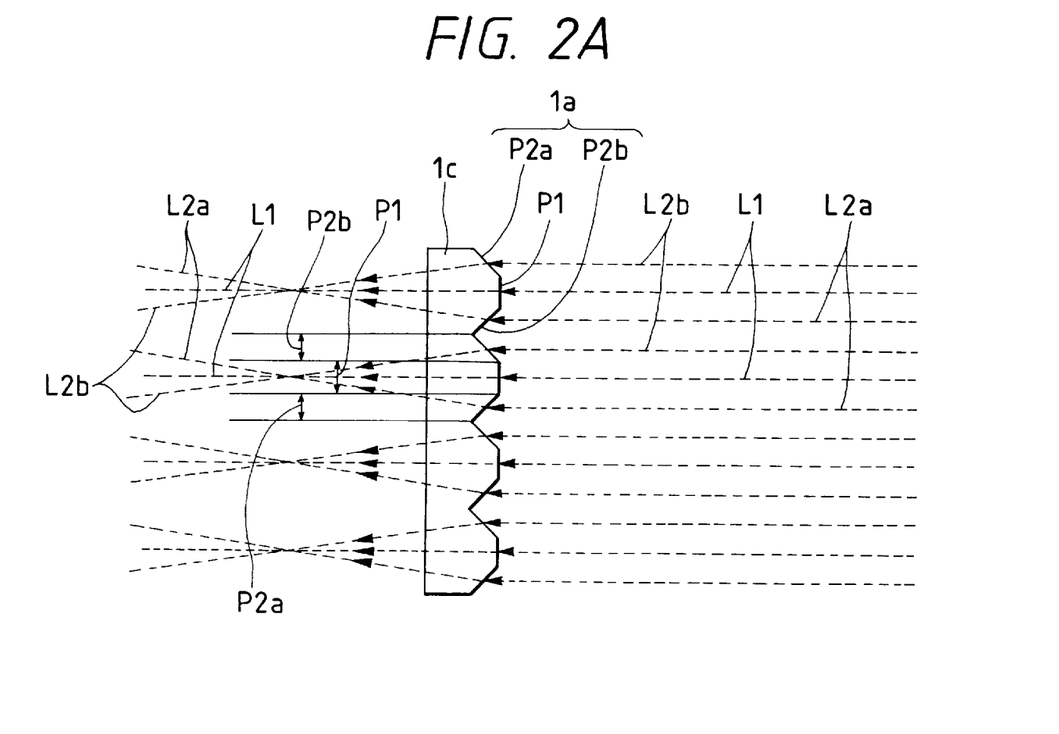
FIGS. 2A and 2B are explanatory views for explaining the principle of the present invention.
Figure 2B:
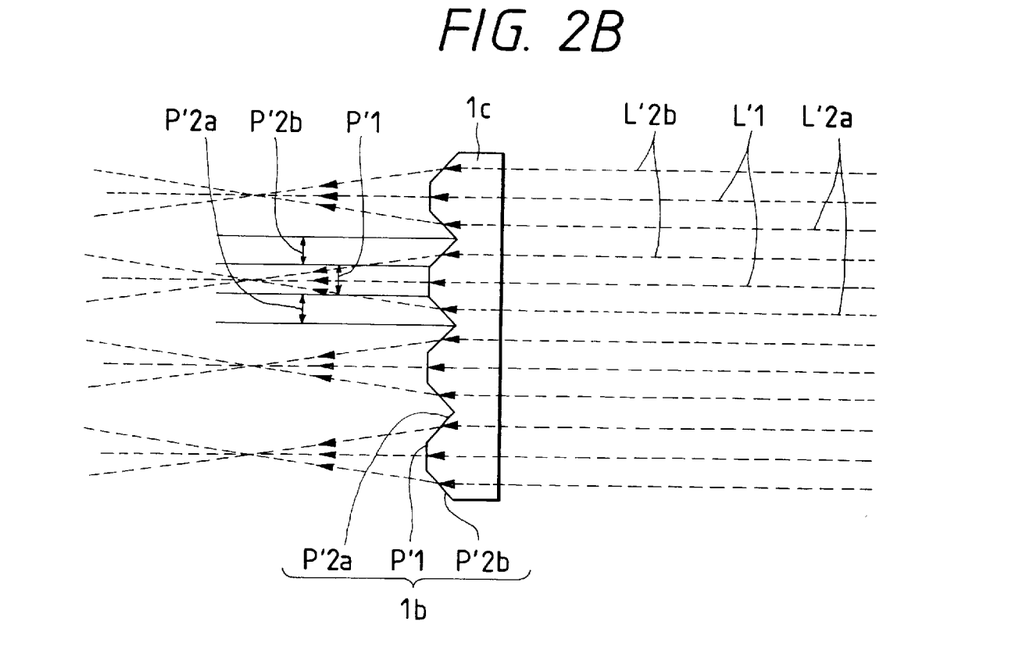

The basic principle of the projection system of this embodiment will be described below with reference to FIGS. 2A and 2B. FIGS. 2A and 2B are enlarged explanatory views of some of the plurality of prism surfaces on the prism members 1a and 1b that make up the optical panel 1 (FIG. 1) when viewed sideways and from above.

In FIGS. 2A and 2B, the prism members 1a and 1b are arranged on the front and rear surfaces of the substrate 1c, respectively and the arranging directions of their prism surfaces are perpendicular to each other.

In FIGS. 2A and 2B, a prism portion (prism surface) P1 of each prism member 1a is made up of a plane perpendicular to the projection direction. Projected light rays (light beam) L1 which come from the light source 4 and pass through the prism portion P1 enter a prism surface P'1 of the prism member 1b shown in FIG. 2B without being deflected. Prism portions P2a and P2b of the prism member 1a are made up of inclined surfaces that make given angles with the optical axis of the projection lens 2, and their normal vectors are present on a plane common to those of the prism portion P1.

Projected light rays (light beams) L2a and L2b that come from the light source 4 and pass through the prism portions P2a and P2b are deflected by the prism portions P2a and P2b, and enter the prism surface P'1 in FIG. 2B to make given angles with the projected light rays L1. The three light beams L1, L2a, and L2b emerging from each prism member 1a respectively enter the prism surface P'1 and prism surfaces P'2a and P'2b of the corresponding prism member 1b, and are split into three light rays L'1, L'2a, and L'2b, as shown in FIG. 2B.

More specifically, in this embodiment, a light beam emitted by the light source 4 receives an imaging effect of the projection lens 2. Then, the light beam is split into three light beams in the vertical direction by the three prism surfaces of each prism member 1a of the optical panel 1, and thereafter, are further split in three beams in the horizontal direction by the three prism surfaces of each prism member 1b of the optical panel 1. As a consequence, the light beam is split into nine directions. In this embodiment, nine projection pattern images are obtained.

Figure 3:
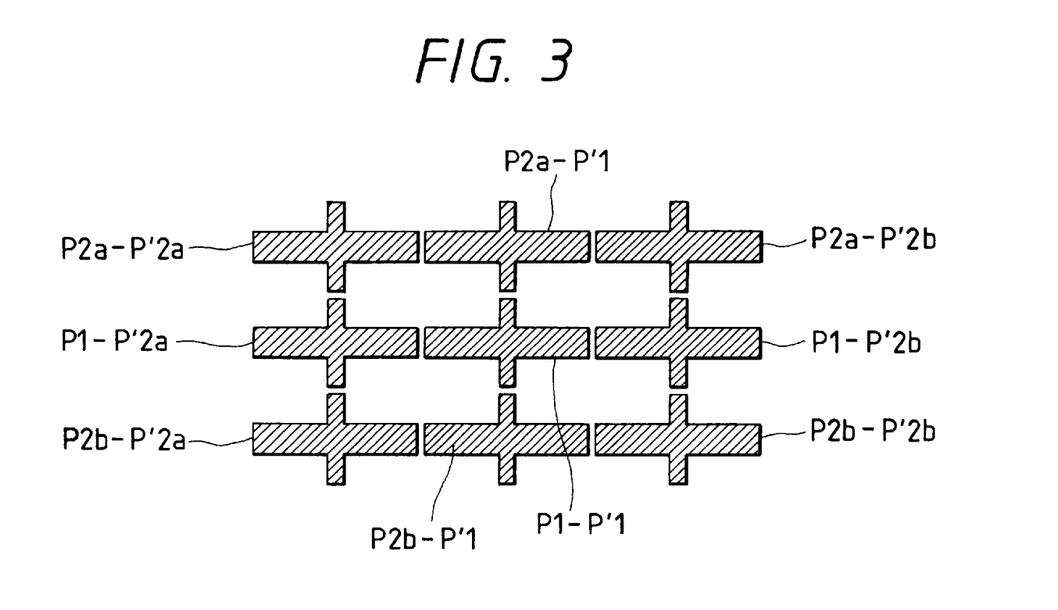
FIG. 3 is an explanatory view showing the projection illumination range in the first embodiment of the present invention.

FIG. 3 is an explanatory view of the projection pattern images at that time. The projection pattern used in projection is the LED 4 having the cross-shaped light-emitting portion 4a, as shown in FIG. 4. Nine regions indicated by hatching in FIG. 3 correspond to nine projection pattern images split by the optical panel 1. As described above, a single pattern is equally split in the horizontal and vertical directions in this embodiment.

In FIG. 3, symbol Px-P'x appended to each hatched portion indicates the prism portions of the prism members 1a and 1b of the optical panel 1, through which a light beam that forms the corresponding projection pattern image has passed. For example, a projection pattern image P2a-P'2b means that it is projected via the prism portion P2a of each prism member 1a of the optical panel 1, and thereafter, the prism portion P'2b of the corresponding prism member 1b.

In this embodiment, the vertical split amount of the projection pattern images is determined by the angles the prism surfaces P2a and P2b make with the optical axis x, and the horizontal split amount of the projection pattern images is determined by the angles the prism surfaces P'2a and P'2b make with the optical axis x. The projection pattern images may be completely separated from each other or may partially overlap each other. That is, an appropriate prism angle is selected depending on the focus detection regions of a focus detection device used to attain appropriate light beam splitting.

In this embodiment, the light amount ratio is easily changed depending on the irradiated positions by changing the area ratio of the prism surfaces P1, P2a, P2b, P'1, P'2a, and P'2b shown in FIGS. 2A and 2B. Furthermore, since a light beam can be split in correspondence with the number of different prism angles, the number of light beams to be split is not limited to nine as in this embodiment, but may be freely set in correspondence with different objectives.

In this embodiment, the prism members 1a and 1b are formed on both surfaces of the single optical panel. However, these prism members need not be integrally formed but may be separately formed. For example, one prism member array may be arranged in front of the projection lens 2, and the other prism member array may be arranged behind the projection lens 2.

In this embodiment, using the light source 4 and the optical panel 1 with the above arrangement, a projection system for automatic focus detection that can project a projection pattern image over a broad range while maintaining a good imaging state of the projection pattern image can be realized.

Figure 6:
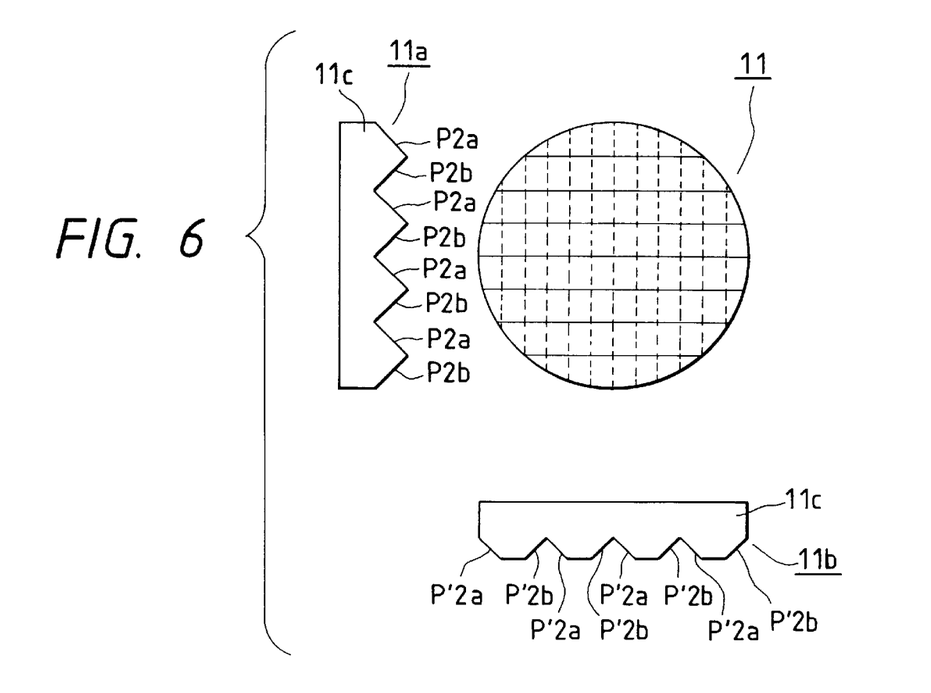
FIG. 6 is an explanatory view of an optical panel according to the second embodiment of the present invention.

FIG. 6 is a schematic view showing the principal part of an optical panel 11 according to the second embodiment of a projection system for automatic focus detection of the present invention.

The optical panel 11 of this embodiment is arranged at substantially the same position as the optical panel 1 shown in FIG. 1, and the arrangement of this embodiment is substantially the same as that of the first embodiment shown in FIG. 1, except for the arrangement of the optical panel 11.

In the optical panel 11 of this embodiment, as shown in FIG. 6, each prism member 11a on the entrance side of a light beam is made up of two prism surfaces P2a and P2b that define a triangular section. On the other hand, each prism member 11b on the exit side of a light beam is made up of three prism surfaces P'1, P'2a, and P'2b that define a trapezoidal section.

In this embodiment, a projection pattern is vertically split into two components by the triangular prism portions P2a and P2b of each prism member 11a on the basis of the same principle as in the first embodiment, and thereafter, these images are split into three directions, i.e., the central and right and left directions, by the trapezoidal prism portions of the corresponding prism member 11b. With this arrangement, when projection is done using the light source 4 having the pattern shown in FIG. 4 as in the first embodiment, projection pattern images split into six directions are obtained, as shown in FIG. 8.

Figure 8:
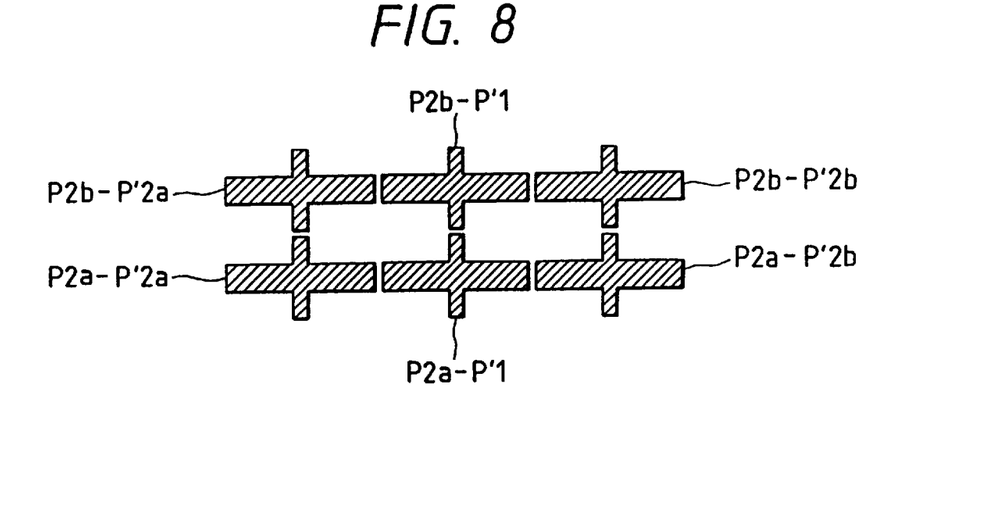
FIG. 8 is an explanatory view of a projection pattern image according to the second embodiment of the present invention.

In FIG. 8, symbol Px-P'x appended to each hatched portion indicates the prism portions of the prism members 11a and 11b of the optical panel 11, through which a light beam that forms the corresponding projection pattern image has passed. For example, a projection pattern image P2a-P'2b means that it is projected via the prism portion P2a of each prism member 11a of the optical panel 11, and thereafter, the prism portion P'2b of the corresponding prism member 11b.

Figure 7:
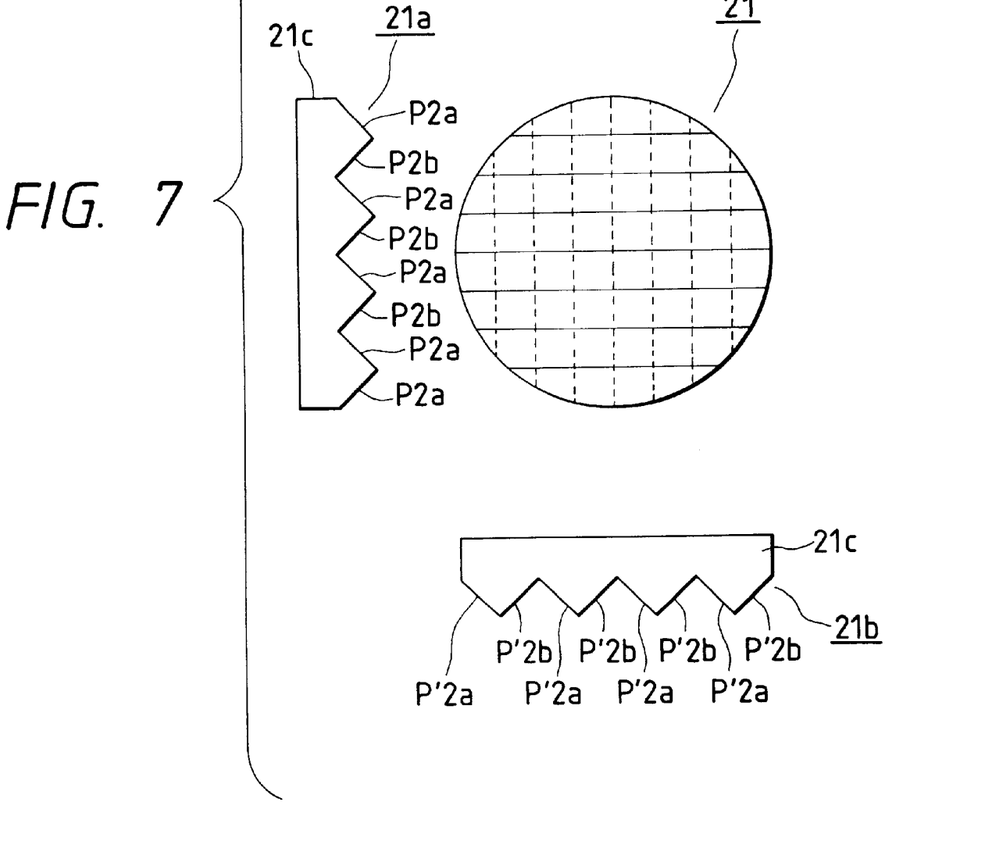
FIG. 7 is an explanatory view of an optical panel according to the third embodiment of the present invention.

FIG. 7 is a schematic view showing the principal part of an optical panel 21 according to the third embodiment of a projection system for automatic focus detection of the present invention. The optical panel 21 of this embodiment is arranged at substantially the same position as the optical panel 1 shown in FIG. 1, and the arrangement of this embodiment is substantially the same as that of the first embodiment shown in FIG. 1, except for the arrangement of the optical panel 21.

In the optical panel 21 of this embodiment, as shown in FIG. 7, each prism member 21a on the entrance side of a light beam is made up of two prism surfaces P2a and P2b that define a triangular section. Likewise, each prism member 21b on the exit side of a light beam is made up of two prism surfaces P'2a and P'2b that define a triangular section.

In this embodiment, a projection pattern is vertically split into two components by the triangular prism portions P2a and P2b of each prism member 21a on the basis of the same principle as in the first embodiment, and thereafter, these images are split into two directions, i.e., the right and left directions, by the triangular prism portions of the corresponding prism member 21b. With this arrangement, when projection is done using the light source 4 having the pattern shown in FIG. 4 as in the first embodiment, projection pattern images split into four directions are obtained, as shown in FIG. 9.

Figure 9:
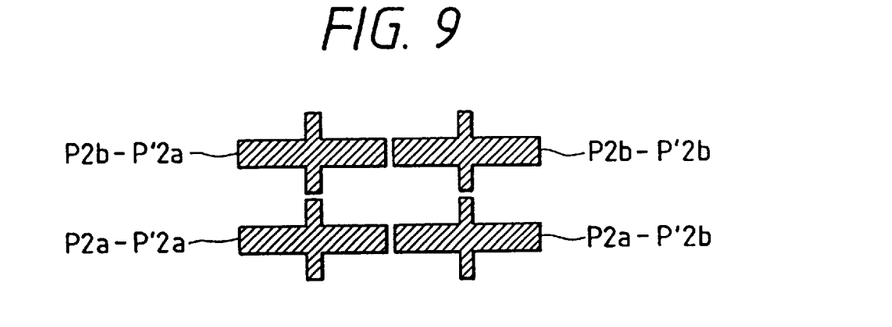
FIG. 9 is an explanatory view of a projection pattern image according to the third embodiment of the present invention.

In FIG. 9, symbol Px-P'x appended to each hatched portion indicates the prism portions of the prism members 21a and 21b of the optical panel 21, through which a light beam that forms the corresponding projection pattern image has passed. For example, a projection pattern image P2a-P'2b means that it is projected via the prism portion P2a of each prism member 21a of the optical panel 21, and thereafter, the prism portion P'2b of the corresponding prism member 21b.

In all the embodiments of the present invention, the split amount of the projection pattern images is determined by the angles the prism surfaces P2a, P2b, and the like make with the optical axis. The projection pattern images may be completely separated from each other or may partially overlap each other. That is, when appropriate prism angles are selected depending on the focus detection regions of a focus detection device used, an appropriate illumination range can be obtained.

In all the embodiments of the present invention, the light amount ratio is easily changed depending on the irradiated positions by changing the area ratio of the prism surfaces P1, P2a, P2b, P'1, P'2a, P'2b, and the like. Furthermore, since a light beam can be split in correspondence with the number of different prism angles, the number of light beams to be split is not limited to four, six, and nine as in the above embodiments, but may be freely set by appropriately selecting the sectional shapes of the prisms.

In each of the above embodiments, prism portions are formed on both surfaces of the single optical panel. However, the prism portions need not be integrated but may be separated. For example, one prism portion array may be arranged in front of the projection lens 2, and the other prism portion array may be arranged behind the projection lens 2.

According to the present invention, as described above, the light-emitting portion of the light source is used as a projection pattern, and an optical panel which is formed on one or both surfaces of a substrate of which a prism member having a plurality of prism surfaces making a plurality of normal line angles with the optical axis of the projection lens is arranged in the vicinity of the projection lens that projects the projection pattern. Hence, a projection system for automatic focus detection that can uniformly project light over a broad illumination range while maintaining a good imaging state of the projection pattern image can be realized.

What is claimed is:

1. A pattern projection device for focus detection, comprising:

a pattern having a shape including a plurality of components including a straight line component; and an optical unit including a prism portion for projecting said pattern such that a plural number of said patterns are projected onto an object in a direction orthogonal to said straight line component of said pattern.

2. A projection device for automatic focus detection, comprising:

a light-emitting portion comprising a pattern having a shape including a plurality of components including a straight line component;

a projection lens for projecting said pattern onto an object; and a prism member including a prism portion disposed in the vicinity of said projection lens for dividing said pattern into a plural number of said patterns in a direction orthogonal to said straight line component of said pattern.

3. A device according to claim 2, wherein said prism portion is provided on one surface of said prism member.

4. A device according to claim 3, wherein said prism portion is provided on the front and rear surfaces of said prism member.

* * * * *

UNITED STATES PATENT AND TRADEMARK OFFICE
CERTIFICATE OF CORRECTION

PATENT NO.    : 5,943,515
DATED         : August 24, 1999
INVENTOR(S)   : Yusuke Omura It is certified that error appears in the above-identified patent and that said Letters Patent is hereby corrected as shown below:

<u>Title page,</u>
Item [56], References Cited, FOREIGN PATENT DOCUMENTS, insert
"9-236860     09/1997     Japan".

Signed and Sealed this

Fifth Day of February, 2002

*Attest:*

*Attesting Officer*

JAMES E. ROGAN
*Director of the United States Patent and Trademark Office*